United States Patent
Cernasov (10) Patent No.: US 8,203,540 B2
(45) Date of Patent: Jun. 19, 2012

(54) LCD PANEL WITH INTEGRAL TOUCHSCREEN

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 1194 days.

(21) Appl. No.: 11/514,912

(22) Filed: Sep. 5, 2006

(65) Prior Publication Data

US 2008/0055261 A1    Mar. 6, 2008

(51) Int. Cl.
*G06F 3/042* (2006.01)

(52) U.S. Cl. .......................... 345/175; 345/176

(58) Field of Classification Search .......... 345/173–175; 178/18.09, 18.01
See application file for complete search history.

(56) References Cited

U.S. PATENT DOCUMENTS

| | | | |
|---|---|---|---|
| 4,345,248 A | | 8/1982 | Togashi et al. |
| 4,855,590 A | * | 8/1989 | Bures et al. .................... 345/175 |
| 4,916,308 A | * | 4/1990 | Meadows ...................... 345/175 |
| 5,105,185 A | | 4/1992 | Nakanowatari et al. |
| 5,105,186 A | | 4/1992 | May |
| 5,764,223 A | * | 6/1998 | Chang et al. .................. 345/175 |
| 6,630,928 B1 | | 10/2003 | McIntyre et al. |
| 6,864,882 B2 | | 3/2005 | Newton |
| 6,943,779 B2 | * | 9/2005 | Satoh ......................... 178/18.01 |
| 7,138,986 B2 | | 11/2006 | Ohtsuka |
| 7,265,747 B2 | | 9/2007 | Martin |
| 7,679,610 B2 | * | 3/2010 | Cernasov .................... 345/175 |
| 2001/0020578 A1 | | 9/2001 | Baier |
| 2001/0050677 A1 | | 12/2001 | Tosaya |
| 2003/0156100 A1 | * | 8/2003 | Gettemy ...................... 345/204 |
| 2003/0227446 A1 | | 12/2003 | Ohtsuka |
| 2004/0140961 A1 | | 7/2004 | Cok |
| 2005/0162381 A1 | | 7/2005 | Bell et al. |
| 2006/0227120 A1 | | 10/2006 | Eikman |
| 2008/0007541 A1 | * | 1/2008 | Eliasson et al. ............... 345/176 |

OTHER PUBLICATIONS

Notice of Panel Decision for U.S. Appl. No. 11/514,911 with a USPTO mail date of Mar. 3, 2010.
Appeal Brief for U.S. Appl. No. 11/514,911 with response filing date of Mar. 29, 2010.
Cernasov, Andrei, "LCD Touchscreen Panel With External Optical Path," U.S. Appl. No. 11/528,404, filed Sep. 28, 2006; published Apr. 3, 2008, U.S. Publication No. 2008-0079687-A1.
United States Patent and Trademark Office Non-Final Office Action mailed Mar. 6, 2009 for U.S. Appl. No. 11/514,911, filed Sep. 5, 2006; published Mar. 6, 2008; U.S. Publication No. 2008-0055494-A1.

(Continued)

*Primary Examiner* — Kevin M Nguyen
(74) *Attorney, Agent, or Firm* — Ingrassia Fisher & Lorenz, P.C.

(57) ABSTRACT

A liquid crystal display (LCD) device (100) having an integrated touchscreen includes a built-in probe signal source behind the liquid crystal (LC) layer (20). The probe signal source may include a pair of light sources (82 and 84) modulated at first and second frequencies (f1 and f2), respectively. A pair of probe light sensing devices (92 and 94) may also be implemented behind the LC layer, each configured to measure the intensities of the first and second frequencies, respectively. The probe light sensing devices are designed to detect user contact with the touchscreen surface by sensing a reflection of the probe light signals from the touchscreen surface. Using the multiple intensity measurements from each probe light sensing device, the location of the point of contact on the touchscreen surface is determined.

13 Claims, 13 Drawing Sheets

OTHER PUBLICATIONS

United States Patent and Trademark Office Non-Final Office Action mailed May 26, 2009 for U.S. Appl. No. 11/515,011, filed Sep. 5, 2006, published Mar. 6, 2008; U.S. Publication No. 2008-0055495-A1.

United States Patent and Trademark Office Non-Final Office Action mailed Jun. 23, 2009 for U.S. Appl. No. 11/528,404, filed Sep. 28, 2006; published Apr. 3, 2008; U.S. Publication No. 2008-0079687-A1.

United States Patent and Trademark Office Final Office Action mailed Oct. 29, 2009 for U.S. Appl. No. 11/514,911, filed Sep. 5, 2006.

Cernasov, Andrei, "LCD Touchscreen Panel With Scanning Backlight," U.S. Appl. No. 11/514,911, filed Sep. 5, 2006; published Mar. 6, 2008, U.S. Publication No. 2008-0055494-A1.

United States Patent and Trademark Office, Non-Final Office Action mailed Sep. 18, 2008 for U.S. Appl. No. 11/514,911, filed Sep. 5, 2006; published Mar. 6, 2008, U.S. Publication No. 2008-0055494-A1.

Cernasov, Andrei, "LCD Panel With Synchronized Integral Touchscreen," U.S. Appl. No. 11/515,011, filed Sep. 5, 2006; published Mar. 6, 2008, U.S. Publication No. 2008-0055495-A1.

United States Patent and Trademark Office, Non-Final Office Action mailed Sep. 19, 2008 for U.S. Appl. No. 11/515,011, filed Sep. 5, 2006; published Mar. 6, 2008, U.S. Publication No. 2008-0055495-A1.

Den Boer, Willem, et al., "Active Matrix LCD with Integrated Optical Touch Screen," SID '03 Digest, 2003.

* cited by examiner

LCD PANEL WITH INTEGRAL TOUCHSCREEN

CROSS-REFERENCES TO RELATED APPLICATIONS

The present invention is related to copending U.S. patent application Ser. No. 11/514,911, entitled "LCD TOUCH-SCREEN PANEL WITH SCANNING BACKLIGHT," which was filed on Sep. 5, 2006, and copending U.S. patent application Ser. No. 11/515,011, entitled "LCD PANEL WITH SYNCHRONIZED INTEGRAL TOUCHSCREEN," which was filed on Sep. 5, 2006. The entire contents of the above-identified related applications are hereby incorporated by reference in their entirety.

FIELD OF THE INVENTION

The present invention relates to a liquid crystal display (LCD) panel with an integrated touchscreen, and more particularly, to providing a mechanism within the LCD panel for detecting user contact with the touchscreen and computing the location of detected contact.

BACKGROUND OF THE INVENTION

For many types of interactive applications, touchscreens are ideal interface devices. This is because they are intuitive, reprogrammable, and capable of being environmentally sealed. Also, touchscreens occupy a relatively small amount of space. Thus, it would be desirable to incorporate touchscreen functionality in applications utilizing liquid crystal display (LCD) panels.

Figure 1A:
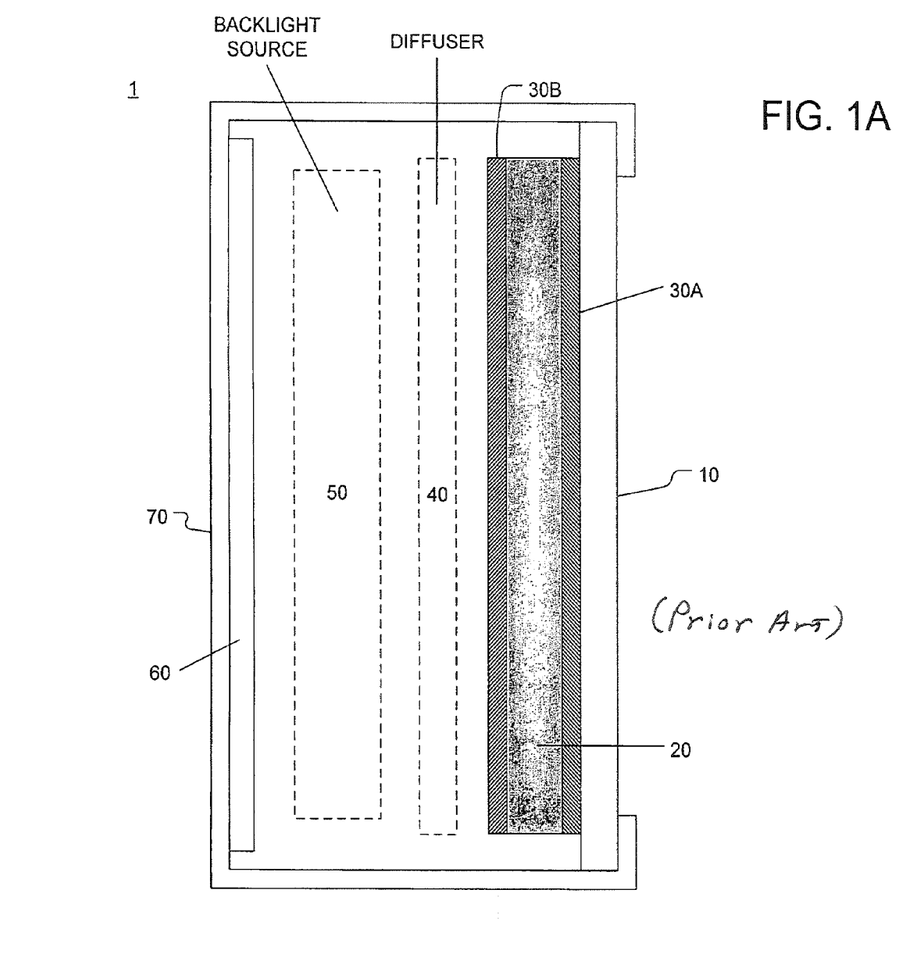
FIGS. 1A and 1B illustrate the configuration of a typical liquid crystal display (LCD) device.
Figure 1B:
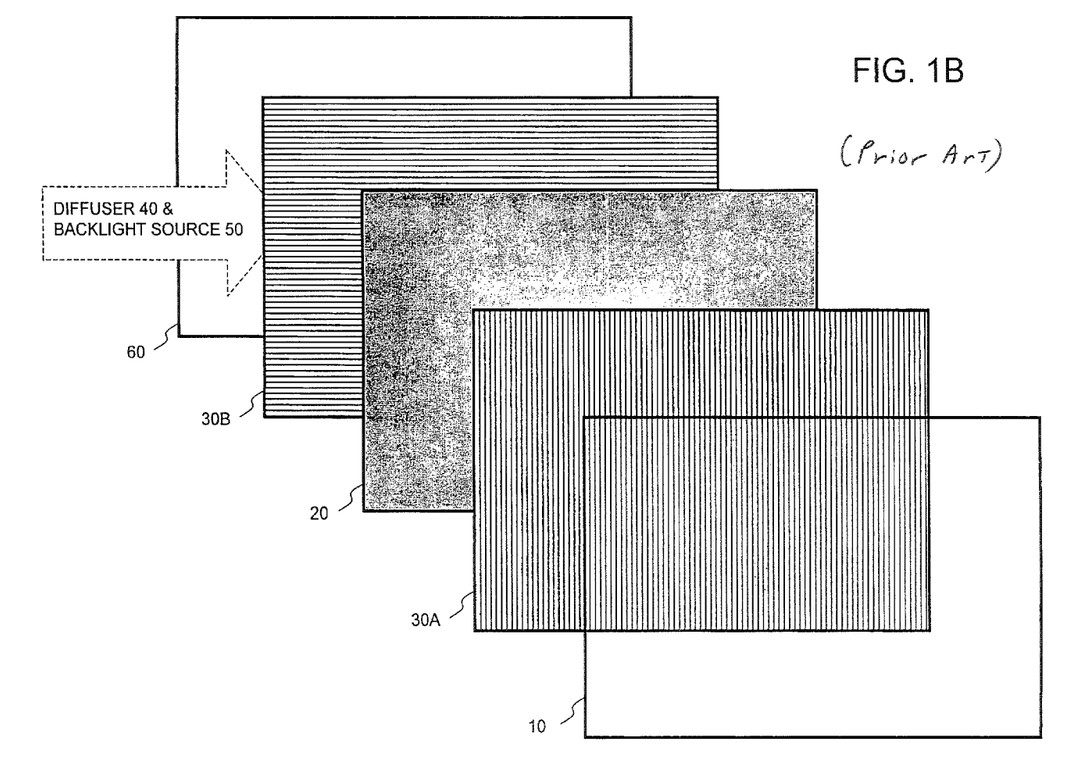

The configuration of a typical LCD device is illustrated in FIGS. 1A and 1B. As shown in FIG. 1A, a typical LCD device 1 includes a liquid crystal (LC) layer 20 sandwiched between two polarizing filters 30A and 30B (hereafter "polarizers"). The LC layer is protected by a transparent front protective sheet 10, e.g., a glass plate. For a backlit LCD device 1, behind the LC and polarizing layers are a light diffusing film 40 (hereafter "diffuser"), a backlight source 50, and a reflective surface 60. However, in a reflective-type LCD device 1, the diffuser 40 and backlight source 50 would be omitted (thus, these layers are illustrated by dotted lines in FIG. 1A). A casing or enclosure 70 is provided to hold the aforementioned layers in place. FIG. 1B illustrates an exploded view of the stack of LCD layers described above. The specification may collectively refer to these layers as the "LCD stack" of a backlit LCD device (including diffuser 40 and backlight source 50) or a reflective-type LCD device (without diffuser 40 or backlight source 50).

In a typical backlit LCD device (also referred to as a "transmissive" LCD device), the backlight is emitted directly from source 50 and reflected from reflective surface 60 to the diffuser 40. The diffuser 40 diffuses this light to make the intensity or brightness more uniform across the LCD. Polarizers 30A and 30B are cross-polarized with respect to each other.

Thus, the backlight polarized by polarizer 30B must be rotated to some extent by LC layer 20 in order to pass through polarizer 30A. The degree to which the LC layer 20 rotates the light is dependent upon the amount of voltage applied across the various liquid crystal molecules in the LC layer 20. For instance, a pair of electrodes (not shown) may be positioned across each LC cell to apply an appropriate voltage to "twist" the corresponding LC molecules, thereby rotating the backlight to pass through. In backlit LCD devices, numbers and characters are displayed according to the LC cells that allow light to pass through polarizers 30A and 30B.

Figure 2A:
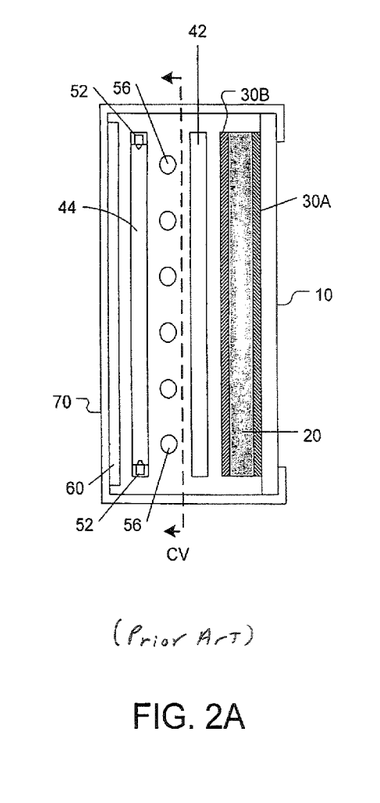
FIGS. 2A and 2B illustrate different types of backlight sources within typical backlit LCD devices.
Figure 2B:
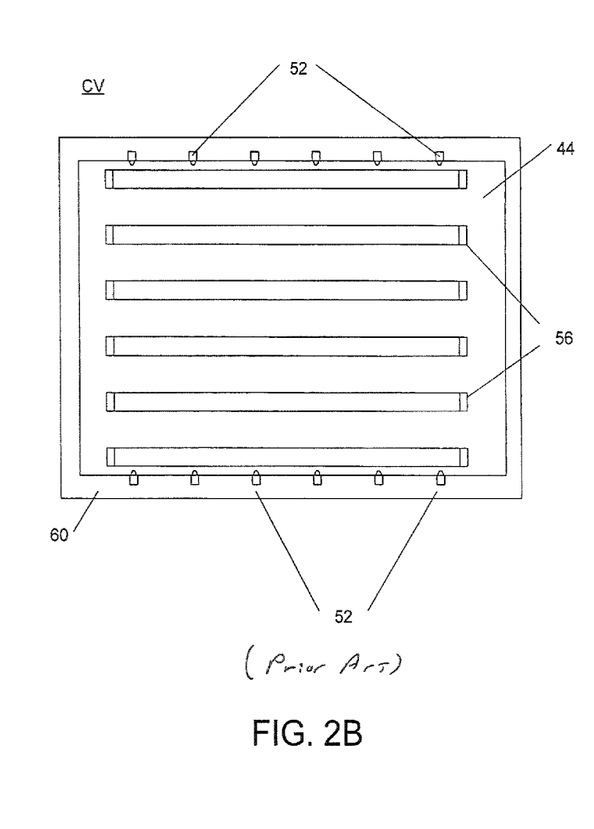

FIGS. 2A and 2B illustrate the different types of backlight sources 50 that can be implemented in a typical backlit LCD device 1. Specifically, FIG. 2A illustrates a side view of a backlit LCD device 1, while FIG. 2B shows a cross-sectional view at CV.

As illustrated in FIGS. 2A and 2B, the backlight source 50 may include a combination of "pinpoint" light sources 52 (e.g., LED lamps) and/or cold cathode fluorescent lamps (CCFLs) 56. Furthermore, different types of diffusers 40 may be used. For instance, these figures show an edge-lit light guide/diffuser 44 dedicated specifically to the pinpoint LED sources 52. Also, a light diffusing sheet 42 may be implemented in front of the CCFL sources 56.

As shown in FIGS. 2A and 2B, the pinpoint light sources 52 are configured to emit light into the edge-lit light guide/diffuser 44, which is situated parallel to the LC layer 20. As such, the edge-lit light guide/diffuser 44 is intended to distribute the light from the pinpoint light sources 52 more uniformly. The combination of the edge-lit light guide/diffuser 44 and LED light sources 52 is generally referred to as an LED edge-lit light guide assembly.

However, as mentioned above, an alternative to backlit LCD devices are reflective-type LCDs. In a reflective-type LCD device, the LC layer 20 is illuminated by external light. Referring again to FIGS. 1A and 1B, after passing through the LC layer 20 and polarizers 30A and 30B, the external light is reflected (and optionally diffused) by the reflective surface 60 back to the viewer. In such devices, the cells in the LC layer 20 are configured, by default, to allow light to pass through. Thus, numbers and characters are displayed using LC cells, which are charged by electrodes (not shown) to block light from passing through polarizers 30A and 30B.

Generally, previous attempts to utilize a touchscreen in conjunction with an LCD panel (backlit or reflective-type) require additional panels or layers to be added to the front protective sheet of the LCD device. This is disadvantageous because it reduces the amount of output light from the LCD, increases the complexity of the resultant device, and reduces overall system reliability.

SUMMARY OF THE INVENTION

Exemplary embodiments of the present invention are directed to a liquid crystal display (LCD) device with an integrated touchscreen, in which a probe signal source and probe signal sensing device are built within the LCD stack behind the liquid crystal (LC) layer. The probe signal source is configured to transmit the probe signal through the LC layer and the touchscreen surface. Thus, when the probe signal sensing device detects a reflection of the probe signal from the touchscreen surface, the LCD device determines that a user has made contact with the touchscreen surface.

The LCD device is further configured to determine the location of the point of contact on the touchscreen surface based on the measurements of the probe signal sensing device. To facilitate this, the probe signal source may include at least two probe light sources modulated at different frequencies. Furthermore, at least two probe light sensing devices may be implemented in the LCD stack, at different locations, each probe sensing device including a separate sensor for each frequency of the probe light sources. Thus, when the user makes contact with the touchscreen surface, some of the light rays from each probe light source are reflected from the point of contact back into the LCD stack, thus causing an increased intensity to be measured at each sensor. Since the amount of increased intensity at each sensor is dependent upon the sensor's relative position with respect to the point of contact, the four sensors provide sufficient information to determine the location of the point of contact on the touchscreen surface.

According to the exemplary embodiment, the LCD device further includes a processing device (e.g., a digital signal processor) for receiving the measured intensities from the light sensing devices and calculating the location of the point of user contact. In one embodiment, the processing device may use a look-up table (LUT) to map the intensity measurements of the probe light sensing devices to a particular location of the point of contact on the touchscreen surface. However, in an alternative embodiment, the processing device may be programmed with mathematical functions or equations for mapping the intensity measurements to the location of the point of contact. For instance, the functions/equations may be defined to map the measured intensities of each probe light sensing device to a positional parameter (e.g., angular position) with respect to the point of contact. By calculating such a parameter for each probe light sensing device, the processing device can determine the location of the point of contact on the touchscreen.

The LCD device of the present invention may be configured as either a backlit or reflective-type LCD. For instance, when implemented in a backlit LCD device, it is possible to implement the probe signal light sources as part of the backlight assembly. For example, the backlight sources may include a light-emitting diode (LED) edge-lit light guide, and each probe signal light source may be an LED built into this assembly. However, the probe signal light sources should be modulated at different frequencies than the other backlight sources, so that the probe signal can be discriminated from the other backlight sources.

Further aspects in the scope of applicability of the present invention will become apparent from the detailed description provided below. However, it should be understood that the detailed description and the specific embodiments therein, while disclosing exemplary embodiments of the invention, are provided for purposes of illustration only.

BRIEF DESCRIPTION OF THE DRAWINGS

A more complete understanding of the present invention will become apparent from the following description taken in conjunction with the accompanying drawings, wherein.

DETAILED DESCRIPTION OF EXEMPLARY EMBODIMENTS

In order to integrate a touchscreen interface with a liquid crystal display (LCD) device, the present invention utilizes probe signals transmitted from within the stack of LCD layers to detect user contact with the touchscreen surface. Specifically, one or more probe signal sensing devices are disposed within the LCD stack in order to detect user contact on the touchscreen surface by sensing a reflection of the probe signals from the touchscreen surface. Accordingly, the front protective sheet of the LCD device may be used as the touchscreen surface without requiring additional layers.

According to an exemplary embodiment, a pair of probe light sensing devices may be similarly implemented behind the LC layer to sense the reflection of probe light. Further, the source of the probe signals may comprise one or more probe light sources implemented behind the liquid crystal (LC) layer within the LCD casing or enclosure.

Figure 3:
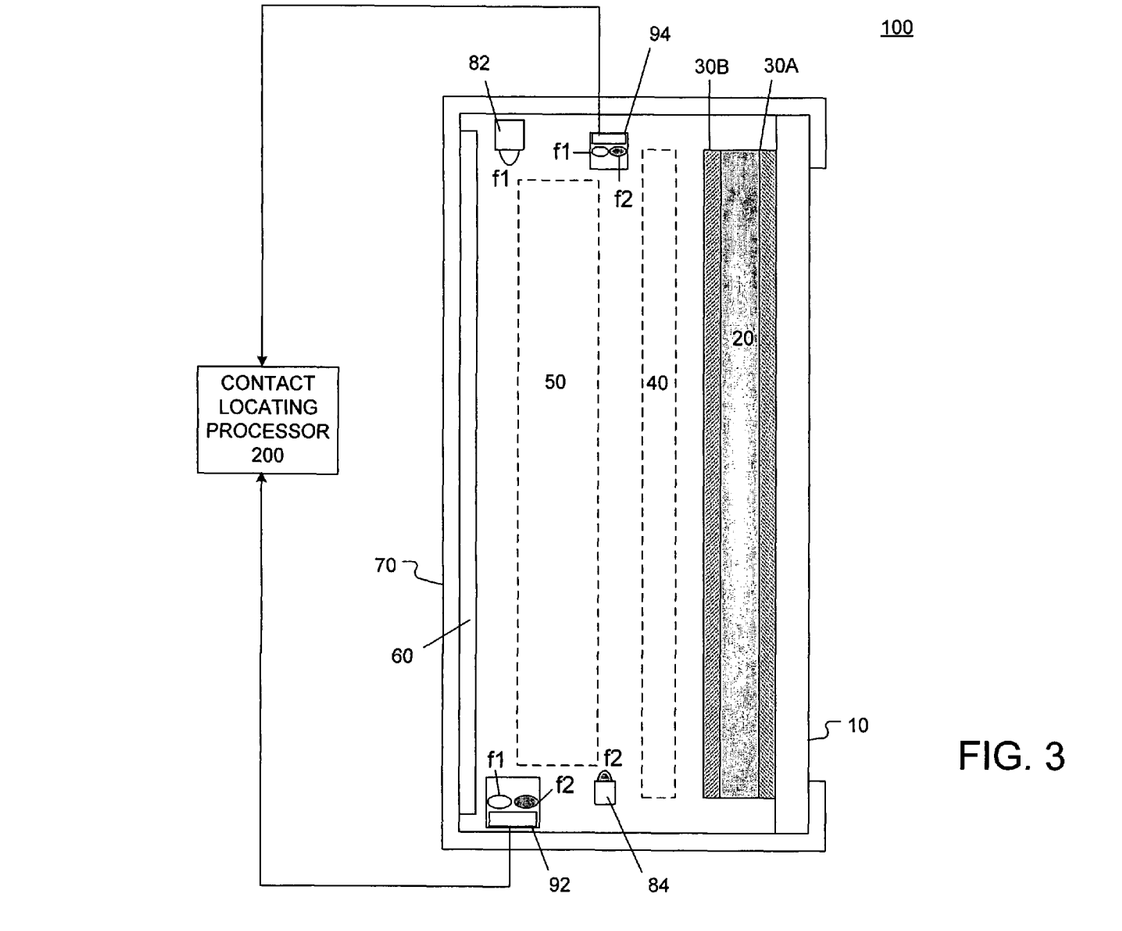
FIG. 3 illustrates an LCD device incorporating a pair of probe light sources and probe light sensing devices, according to an exemplary embodiment of the present invention.

FIG. 3 illustrates an embodiment where a pair of probe light sources 82, 84 and probe light sensing devices 92, 94 within an LCD device 100 according to an exemplary embodiment of the invention. In the LCD stack of FIG. 3, the diffuser 40 and backlight source 50 are represented by dotted lines to indicate that the inclusion of such layers is optional. In other words, the LCD device 100 of the present invention may be configured either as a backlit or reflective-type LCD.

Referring to FIG. 3, the probe light sources 82 and 84 may be configured as pinpoint sources, e.g., light-emitting diodes (LEDs). For instance, if the LCD device 100 utilizes an LED edge-lit light guide assembly (as illustrated in FIGS. 2A and 2B), it is contemplated that the probe light sources 82 and 84 may be integrated with this assembly.

Although FIG. 3 illustrates the probe light sources 82 and 84 as being distanced from one another, this is not necessarily the case. As will be described in more detail below with respect to FIGS. 7A-7C, the probe light sources 82 and 84 may be co-located at a particular corner or region of the device. If the probe light sources 82 and 84 are disposed at separate locations, their relative locations may vary according to various design parameters and other considerations, as will be readily contemplated by those of ordinary skill in the art.

In an exemplary embodiment, the probe light sources 82 and 84 are modulated at different fixed frequencies. For instance, as shown in FIG. 3, probe light source 82 may be modulated at the frequency f1 and the other probe light source 84 may be modulated at frequency f2. For embodiments relating to a backlit LCD device 100, the probe light frequencies f1 and f2 may be designed to easily differentiate the signals of probe light sources 82 and 84 from the backlight sources (e.g., pinpoint light sources 52 and CCFLs 56 in FIGS. 2A and 2B). Accordingly, frequencies f1 and f2 may be set above the flicker rate of the LCD, e.g., 50 Hz. In an exemplary embodiment, the probe light frequencies f1 and f2 may be set in the range of 100-150 kHz, which is well above the flicker rate.

Furthermore, the probe light sources 82 and 84 may be operating within, or near, the infrared range to help further distinguish the probe signals from the backlight sources 50. In such an embodiment, the probe light sensing devices 92 and 94 may contain infrared sensors for sensing the probe light signals. The use of infrared or near-infrared probe signals has the advantage of not altering the total visible illumination provided by the backlight.

The probe light sources 82 and 84 are modulated at different frequencies f1 and f2 so that their emitted signals can be differentiated from one other by the probe light sensing devices 92 and 94. Referring again to FIG. 3, each probe light sensing device 92, 94 includes a pair of light sensors that are sensitive to frequencies f1 and f2, respectively. In other words, each probe light sensing device 92, 94 is configured to measure the light intensity at frequency f1 and the light intensity at f2. As shown in FIG. 3, each probe light sensing device 92, 94 sends the measured intensities to a contact locating processor 200, which is configured to locate a point of contact on the touchscreen surface based on the measured intensities.

In an exemplary embodiment, the contact locating processor 200 is programmed to use look-up tables (LUTs) or mathematical calculations to map the received intensities to the location of the point of contact with respect to the touchscreen surface. For example, the contact locating processor 200 may be a digital signal processor (DSP) or a similar type of processing device.

To make the operation of the contact locating processor 200 more effective, the probe light sensing devices 92 and 94 may be disposed at some distance apart from each other with respect to the planar dimensions of the touchscreen surface.

Figure 4A:
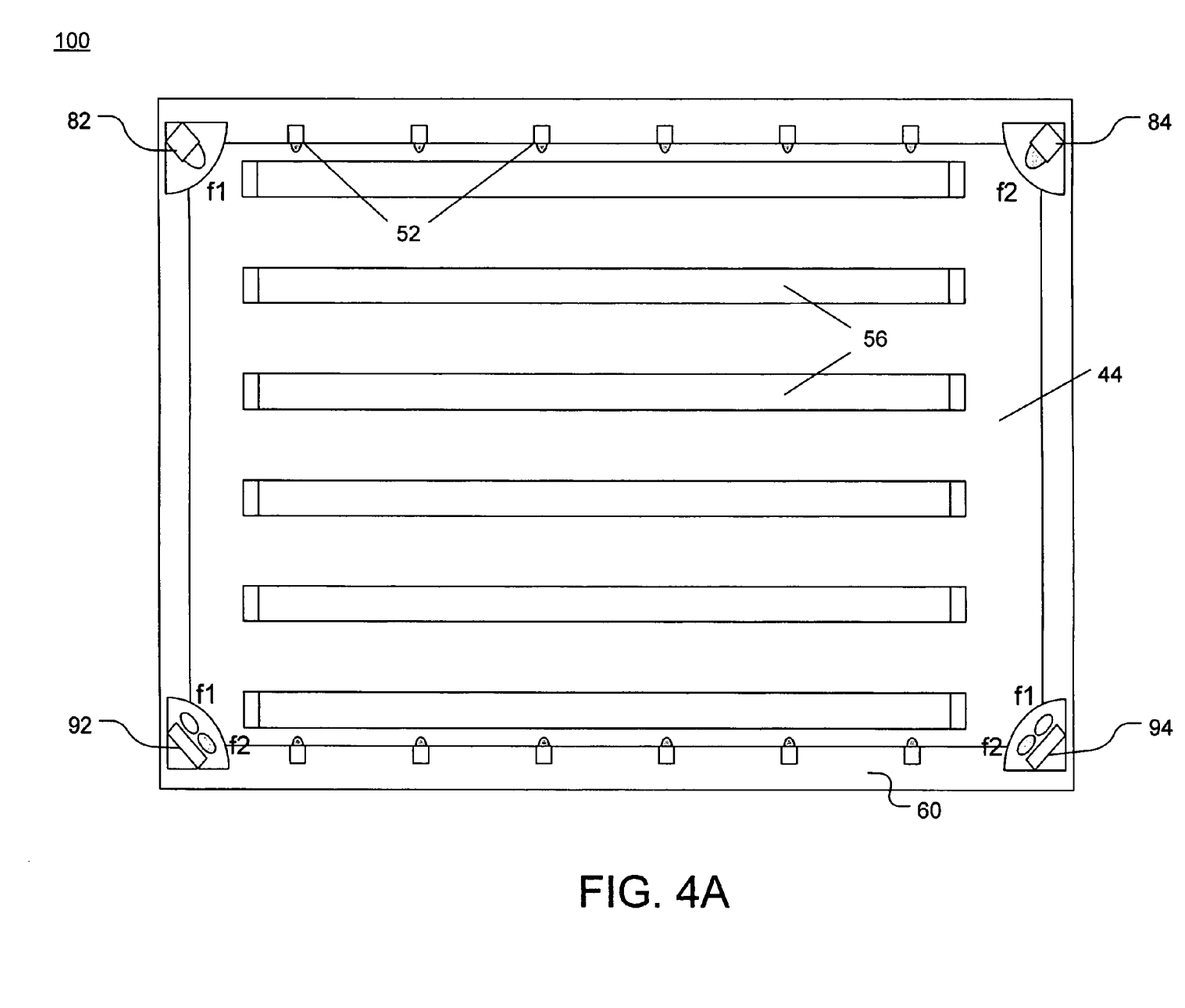
FIG. 4A illustrates probe light sources and probe light sensing devices integrated with the backlight source of a backlit LCD device, according to an exemplary embodiment of the present invention.

For example, as shown in FIG. 4A, the probe light sensing devices 92 and 94 may be disposed at opposing ends of a common side. Alternatively, it may be even more effective to place the probe light sensing devices 92 and 94 cater-corner to each other, in order to increase the distance between them, as shown in FIGS. 4B and 4C.

As to the probe light sources 82 and 84, whether or not they are distanced from each other (e.g., FIGS. 4A and 4B) or co-located (e.g., FIG. 4C) may depend on whether the contact locating processor 200 uses LUTs or mathematical equations to map the measured intensities to the location of the point of contact.

Figure 4B:
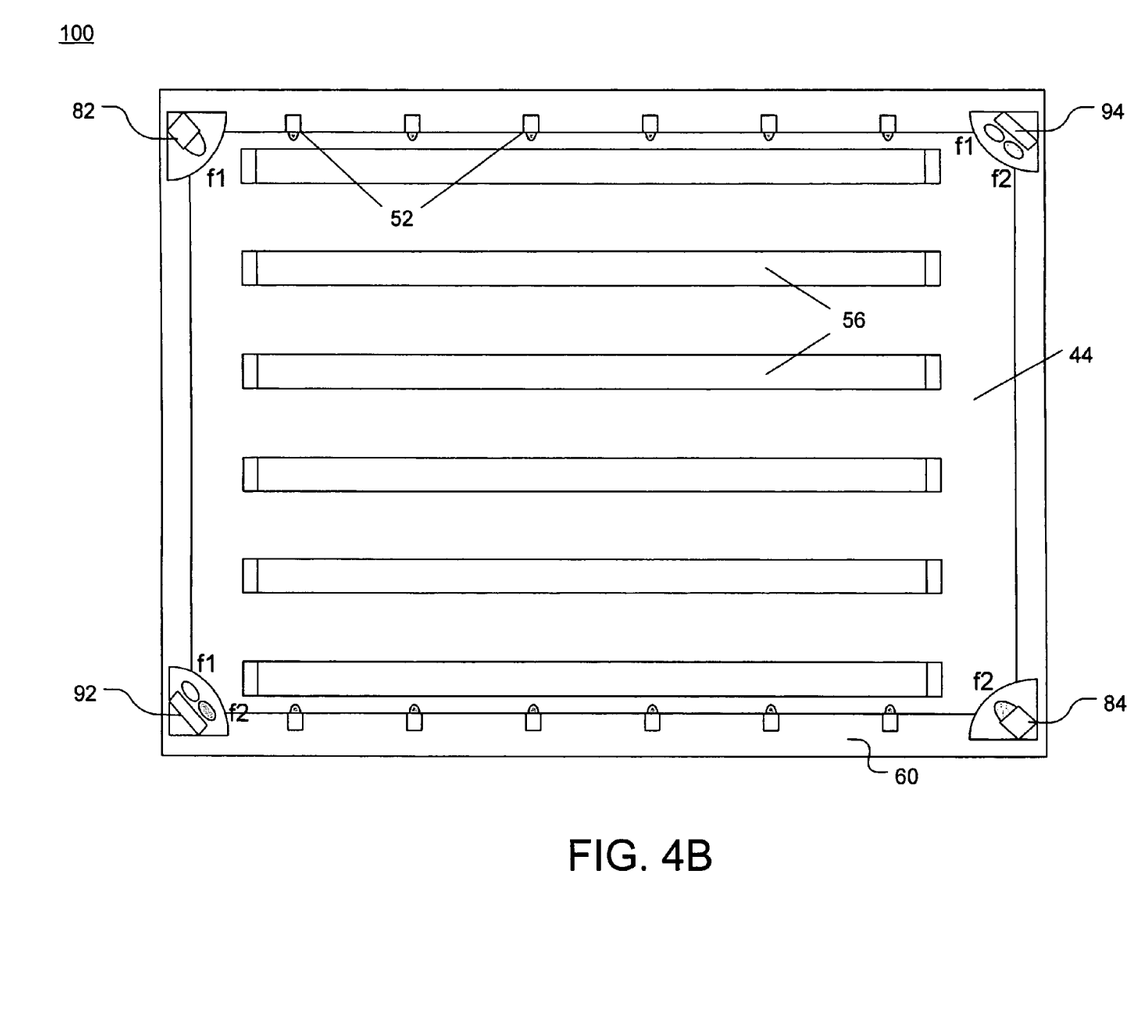
FIGS. 4B and 4C illustrate alternative configurations, respectively, of the probe light sources and probe light sensing devices integrated with the backlight source of a backlit LCD device, according to an exemplary embodiment of the present invention.
Figure 4C:
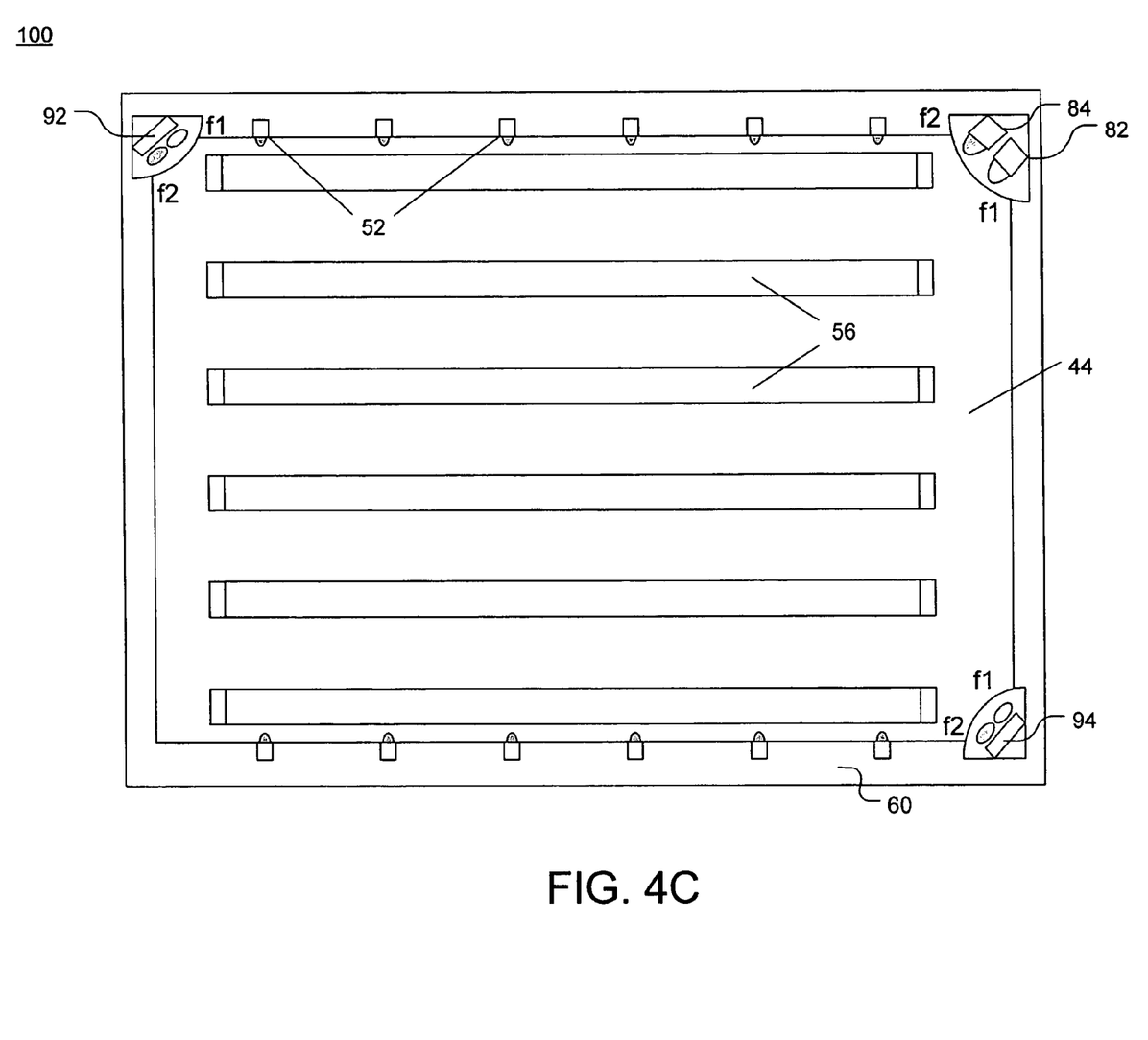
Figure 5:
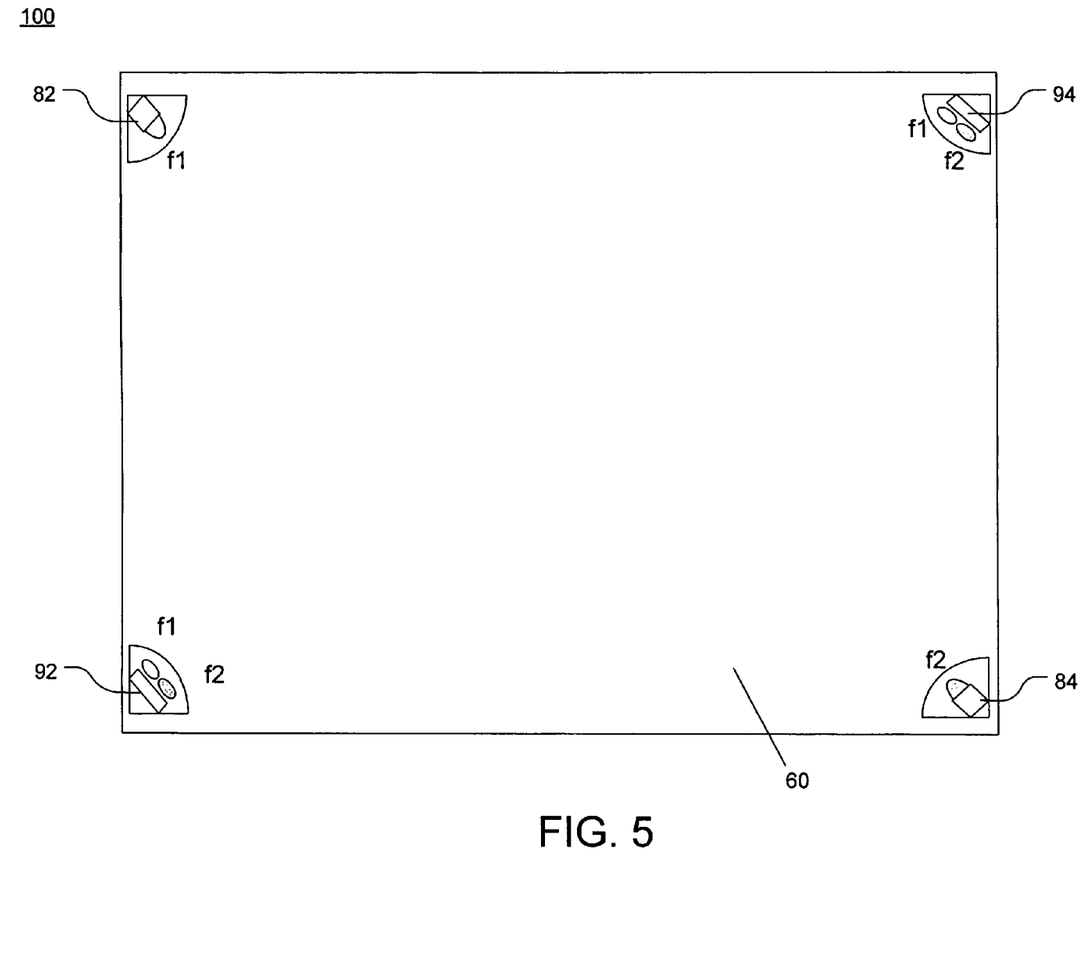
FIG. 5 illustrates probe light sources and probe light sensing devices that are integrated in a reflective-type LCD device, according to an exemplary embodiment of the present invention.

As shown in FIGS. 4A-4C, the probe light sources 82 and 84 and probe light sensing devices 92 and 94, may be disposed at the same level as the backlight sources (as shown in FIGS. 2A and 2B) behind the LC layer 20 and polarizers 30A and 30B. On the other hand, for a reflective-type LCD device, FIG. 5 illustrates that the probe light sources 82 and 84 and probe light sensing devices 92 and 94 may be disposed in front of the reflective layer 70.

Figure 6A:
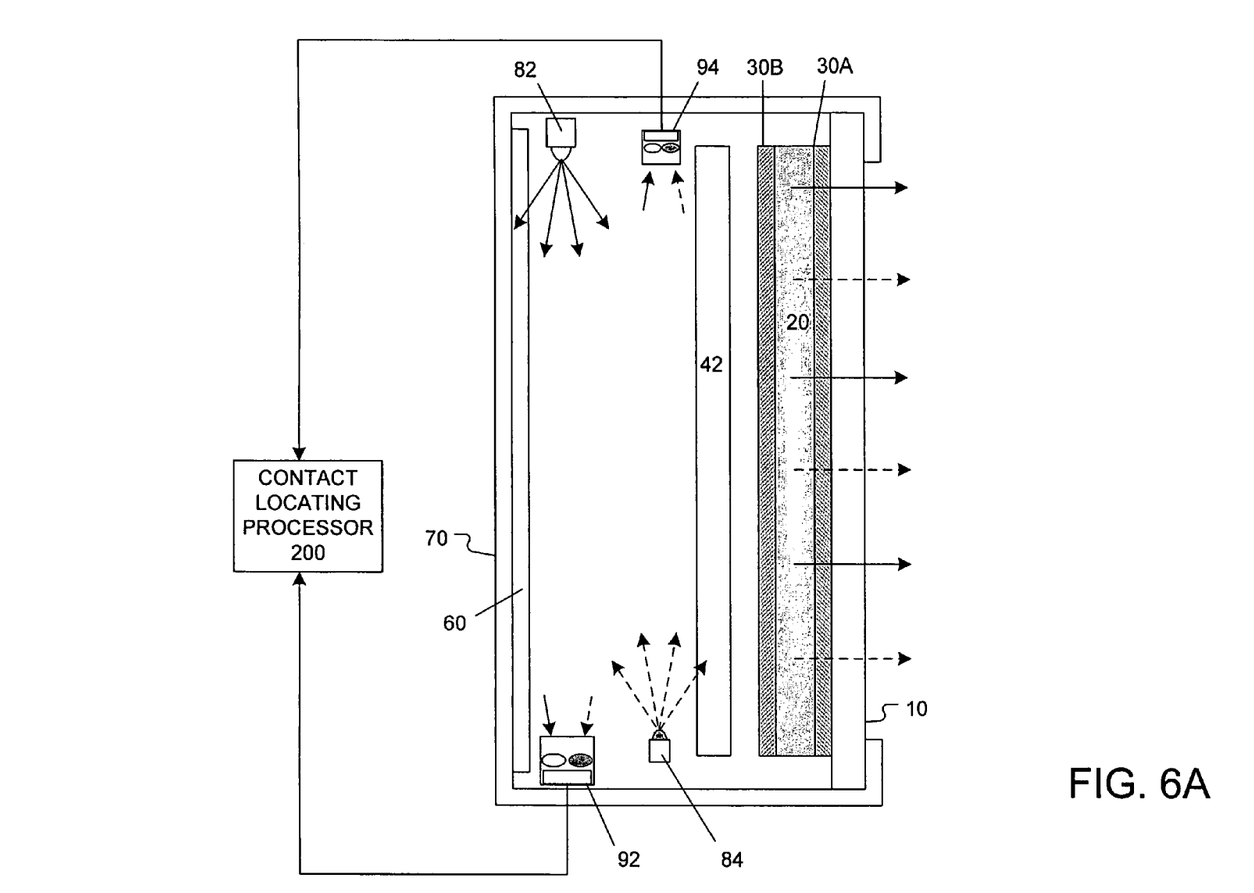
FIGS. 6A and 6B illustrate the effects of user contact with the touchscreen surface on the probe signal light rays within the LCD device, according to an exemplary embodiment of the present invention.
Figure 6B:
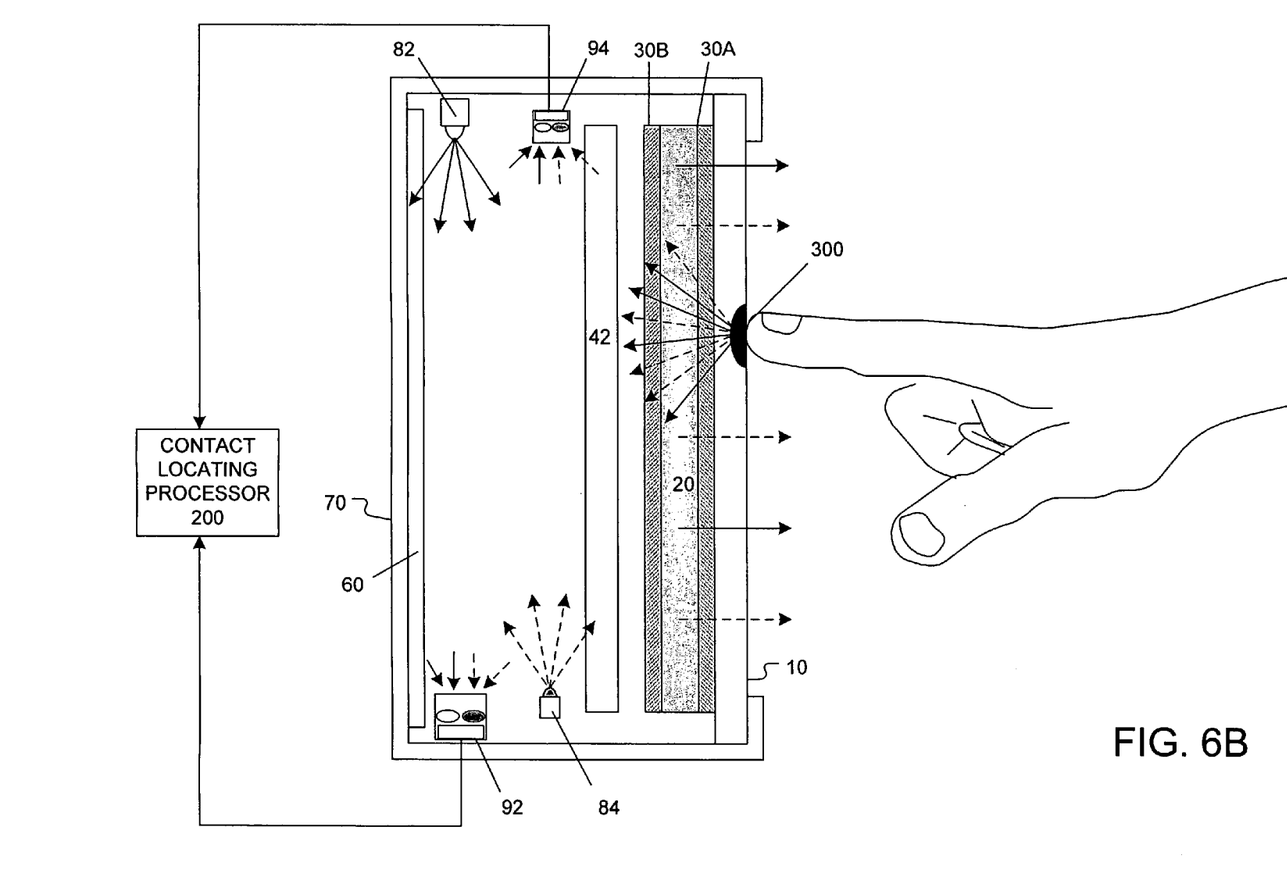

FIGS. 6A and 6B help demonstrate the principles of the present invention discussed below. Although FIGS. 6A and 6B do not show any backlight sources, it will be readily apparent to those of ordinary skill in the art that the following principles apply equally to backlit and reflective-type LCD devices. Furthermore, while FIGS. 6A and 6B illustrate probe light sources 82 and 84 at separate locations, this is merely exemplary. The principles demonstrated in FIGS. 6A and 6B also apply to embodiments where probe light sources 82 and 84 are co-located.

Specifically, FIG. 6A illustrates the emission of probe light signals when there is no user contact with the touchscreen surface. In FIG. 6A, solid arrows are used for illustrating light rays from probe light source 82, while dotted line arrows are used for illustrating the rays from probe light source 84. As shown in this figure, a substantial portion of the probe light from sources 82 and 84 are transmitted through the LC layer 20 and touchscreen surface (front layer 10). While no user contact is being made with the touchscreen surface, the intensity of probe light rays received at the probe light sensing devices 92 and 94 should remain relatively constant. The intensities detected at each probe light sensing device 92, 94 will depend on its respective distance from the probe light sources 82 and 84. As such, these intensities represent a reference level.

FIG. 6B illustrates a situation where the user makes contact with the touchscreen surface, thereby increasing the intensity of probe light within the LCD stack. As shown in this figure, at the point of contact 300, probe light rays from sources 82 and 84 are reflected back into the LCD stack toward the probe light sensing devices 92 and 94. This will increase the measured intensities at the sensors of the probe light sensing device 92, 94. This is illustrated in FIG. 6B by the increased number of light rays (arrows) entering each probe light sensing device 92, 94. The amount by which the measured intensity increases will also depend on the distance between the probe light sensing device 92, 94 and the point of contact 300. As shown in FIG. 6B, the contact locating processor 200 receives the measured intensities from each probe light sensing device 92, 94 in order to determine the location of point of contact 300 based on the touchscreen surface.

The additional intensities measured at each probe light sensing device 92, 94 will depend on both variable and non-variable conditions. Examples of non-variable conditions include the internal characteristics of the LCD stack (including the presence of a backlight assembly, light diffusers, other elements), as well as the reflectivity at the point of contact 300. Their effects on light intensity can be determined according to a calibration process on the device 100 during a pre-operation stage (e.g., manufacturing/testing).

However, the increased intensities also depend on the location of the point of contact 300, i.e., the unknown parameter to be determined by the contact locating processor 200. The measured intensities may also be affected by changes in the ambient light level.

To determine the location coordinates of the point of contact 300 with respect to the planar dimensions of the touch screen surface, the contact locating processor 200 is programmed to match the measured intensities to the location coordinates. The contact locating processor 200 may be designed to continuously evaluate measured intensities (e.g., according to a sampling rate). If any set of measured intensities rise above the reference level, indicating an increased intensity, the contact locating processor 200 may be triggered to process the measured intensities to locate a point of contact 300 on the touchscreen surface.

According to one exemplary embodiment, the contact locating processor may include (or be programmed to access) one or more look-up tables (LUTs) mapping the received set of measured intensities to particular location coordinates for the point of contact 300. This embodiment is especially effective when the probe light sources 82 and 84 are disposed in separate locations (e.g., in FIG. 4A or 4B), since their respective probe light rays will be affected differently by the internal characteristics of the LCD stack.

In an embodiment utilizing one or more LUTs, a pre-operational calibration process during which user contact is simulated for a plurality of locations on the touchscreen surface, and the corresponding measurements of the probe light sensing devices 92 and 94 are recorded for each simulated point on the touchscreen surface. The results of such calibration may be stored in the LUT(s) and, during operation, the contact locating processor 200 maps each set of received intensity measurements to the LUT(s) to determine a corresponding location for the point of contact 300. It will be readily apparent to those of ordinary skill in the art the various types of calibrations and tests that may be performed to establish the LUT data.

Furthermore, for embodiments utilizing an LUT to locate the point of contact, the LCD device 100 may include an ambient light detector to help compensate for changes in the ambient light level. For example, the contact locating processor 200 may be programmed to adjust the intensity measurements, as needed, based on the detected level of ambient light.

According to an alternative exemplary embodiment, the contact locating processor 200 may be programmed with mathematical functions or equations for determining the location of the point of contact 300. In particular, this alternative embodiment is well suited to a configuration where the probe light sources 82 and 84 are co-located (e.g., in FIG. 4C). When the probe light sources 82 and 84 are close together, their respectively rays will be affected the same way by the internal characteristics of the LCD stack. This allows the effects of the internal characteristics to cancel out.

As such, a set of mathematical functions may be defined for each probe light sensing device 92, 94 to map its measured intensities to a parameter related to the sensing device's relative position with respect to the point of contact 300. For instance, in a particular embodiment, the measured intensities of each probe light sensing device 92, 94 can be mapped to a relative angular position of point of contact 300. This particular embodiment will be described in more detail in connection with FIGS. 7A-7C.

Figure 7A:
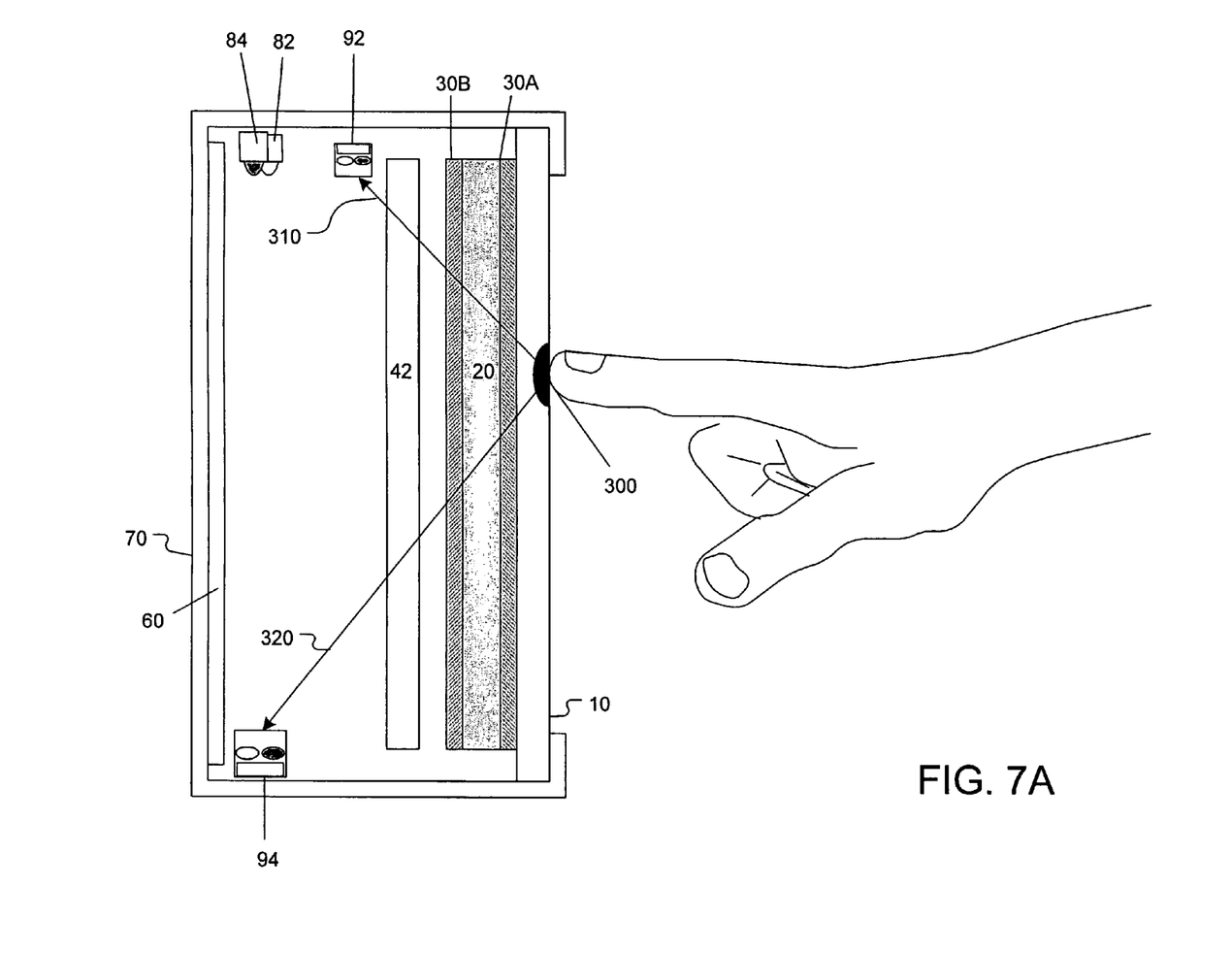
FIG. 7A illustrates paths from the point of contact on the touchscreen surface to the probe light sensing devices according to an exemplary embodiment of the present invention.
Figure 7B:
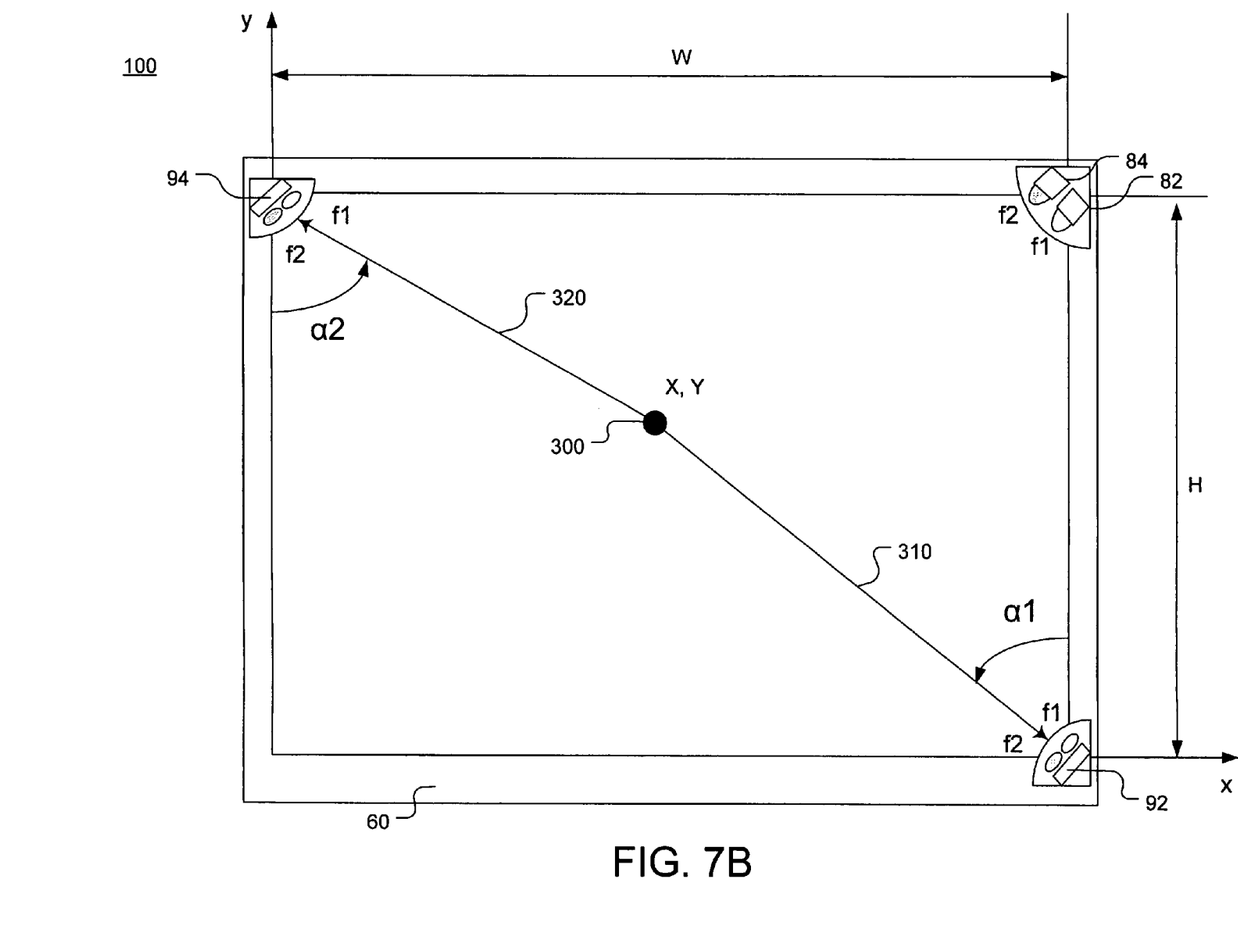
FIG. 7B illustrates parameters related to the relative positions of the probe light sensing device with respect to the point of contact, which can be used for computing the location of the point of contact on the touchscreen surface, according to an exemplary embodiment of the present invention.
Figure 7C:
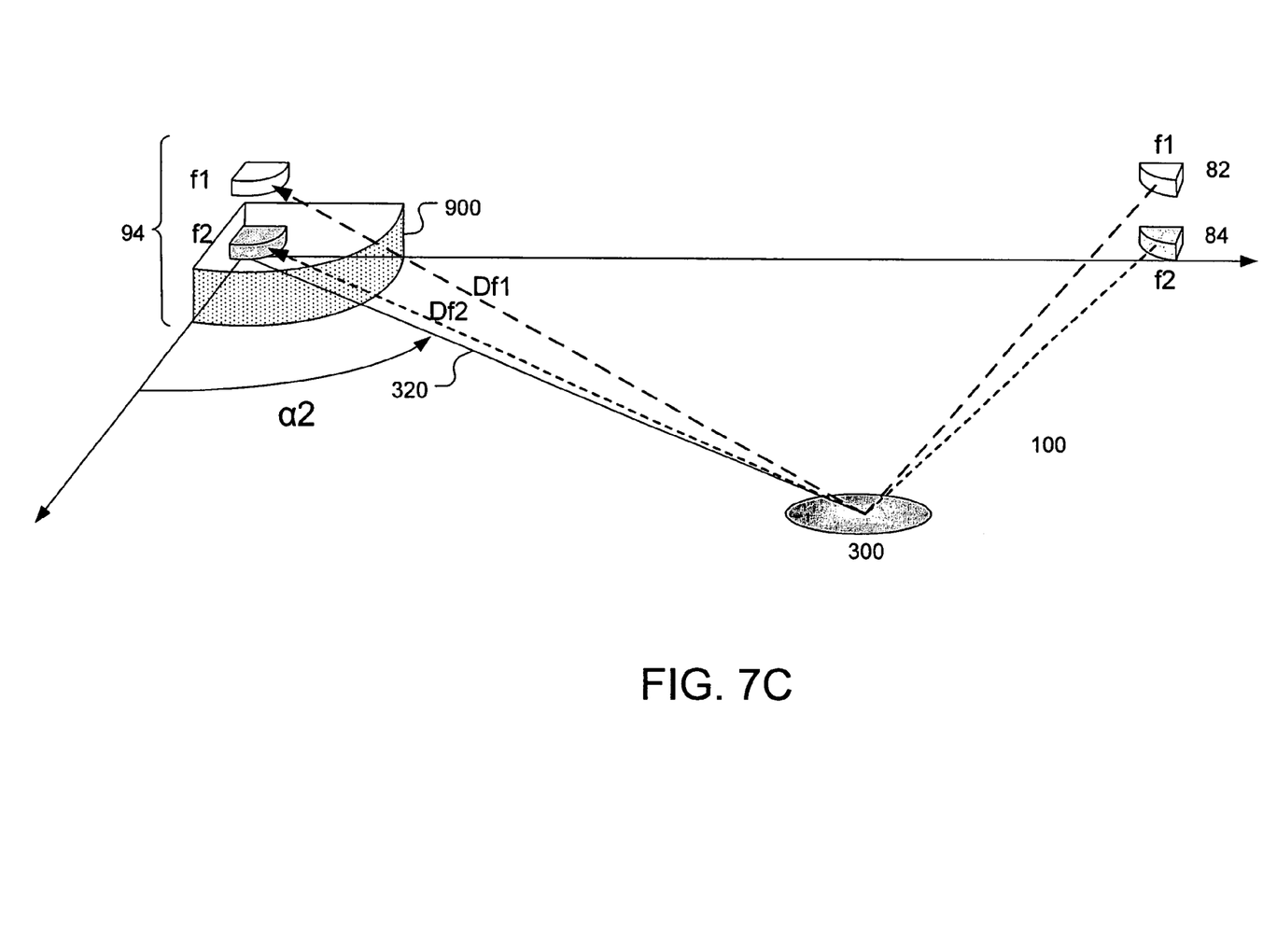
FIG. 7C illustrates a more detailed view of a probe light sensing device for describing the relationship between the light intensity measurements and the location of the point of contact, according to an exemplary embodiment of the present invention.

In particular, FIGS. 7A-7C illustrate paths connecting the point of contact 300 to the probe light sensing devices 92, 94. In these figures, line 310 illustrates a path from the point of contact 300 to the probe light sensing device 92, while line 320 illustrates a path from point of contact 300 to the probe light sensing device 94.

As illustrated in FIG. 7B, paths 310 and 320 move toward the probe light sensing devices 92 and 94 at angles of α1 and α2, respectively. Accordingly, parameters α1 and α2 represent a relative angular position between the point of contact 300 and each of the probe light sensing devices 92 and 94, respectively. Referring again to FIGS. 7B, H and W refer to the height and width dimensions, respectively, of the touchscreen surface. Thus, after parameters α1 and α2 are derived (e.g., according to calculations described below in connection with FIG. 7C), the X, Y position of the point of contact 300 may be calculated according to the following equations:

$$X = [H\sin(\alpha 2) - W\cos(\alpha 2)] \cdot \frac{\sin(\alpha 1)}{\sin(\alpha 2 - \alpha 1)} \quad \text{(Eq. 1)}$$

$$Y = [W\cos(\alpha 1) - H\sin(\alpha 1)] \cdot \frac{\cos(\alpha 2)}{\sin(\alpha 2 - \alpha 1)} \quad \text{(Eq. 2)}$$

With reference to FIG. 7C, an exemplary technique for mapping the measured intensities of the probe light sensing devices 92 and 24 to their respective angular position parameters α1 and α2 will now be described. Specifically, FIG. 7C illustrates the particular case where the measured intensities of probe light sensing device 94 are mapped to angular parameter α2.

As shown in FIG. 7C, the probe light sources 82 and 84 are co-located in nearly the same planar (x, y) coordinates. This figure also shows that the light sensors in the probe light sensing device 94 are also co-located in nearly the same planar coordinates. The particular configuration of FIG. 7C may be varied, however. For example, instead of stacking the probe light sources 82 and 84, they may be placed beside each other and still be deemed "co-located" for purposes of this invention.

FIG. 7C further illustrates that a filter 900 is placed in front of one of the light sensors in the probe light sensing device 94. For purpose of illustration, FIG. 7C shows the filter 900 being placed in front of the light sensor that is sensitive to frequency f2. The filter 900 has a predetermined opacity, which is a function of the angle (α2) associated with the incoming light. For example, the opacity may be set to $T_0 \sin \alpha 2$, where $T_0$ is a maximum opacity parameter.

The intensities of light rays originating at probe light sources 82 and 84, respectively, and bouncing back at the point of contact 300 are represented by $I_{f1}$ and $I_{f2}$. Since the difference in position between probe light sources 82 and 84 is negligible, $I_{f1}$ and $I_{f2}$ are assumed to be equal. Of course, this assumption is based on the further assumption that sources 82 and 84 are rated for the same intensity. If sources 82 and 84 are rated at different intensities, the values of $I_{f1}$ and $I_{f2}$ should be normalized based on the rated intensities.

Furthermore, since the difference in position between the light sensors in light sensing device 94 is also negligible, their respective distances from the point of contact 300 are assumed to be equal. Thus, referring to FIG. 7C, it is assumed that Df1=Df2, where Df1 represents the distance between point of contact 300 and the light sensor for frequency f1, and Df2 represents the distance between point of contact 300 and the light sensor for frequency f2.

Thus, the following relationships may be established between the measured intensities and the angle α2 associated with path 310:

$$S(f1) = \frac{I_{f1}}{(Df1)^2} \quad \text{(Eq. 3)}$$

$$S(f2) = T_0 \sin\alpha 2 \cdot \frac{I_{f2}}{(Df2)^2} \quad \text{(Eq. 4)}$$

where
S(f1) is the intensity measurement of the light sensor for frequency f1;
S(f2) is the intensity measurement of the light sensor for frequency f2;
and $T_0$ is the opacity for filter 900.

Furthermore, using the assumption Df1=Df2, the following relationships are also established:

$$\frac{S(f1)}{S(f2)} = T_0 \sin\alpha 2 \quad \text{(Eq. 5)}$$

$$\alpha 2 = \arcsin\left[\left(\frac{S(f1)}{S(f2)}\right) / T_0\right] \quad \text{(Eq. 6)}$$

Furthermore, Eqs. 3-6 may similarly be applied to the measured intensities of the probe light sensing device 92 in order to calculate the angle $\alpha 1$ associated with path 310. Thus, by plugging in the values of $\alpha 1$ and $\alpha 2$ into Eqs. 1 and 2 above, the X, Y coordinates of point of contact 300 can be determined.

While a particular embodiment is described above using mathematical equations to map the measured intensities to angular position parameters $\alpha 1$ and $\alpha 2$, the contact locating processor 200 may programmed with other types of mathematical equations that map the measured intensities to the position of the point of contact 300, as will be readily contemplated by those of ordinary skill in the art.

The present invention is applicable to various types of touchscreen applications. For instance, in an exemplary embodiment, the touchscreen surface may be partitioned into a set of "keys" from which the user may choose. Thus, by determining the location of the point of contact 300, the LCD device 100 can determine which particular key on the touchscreen surface has been touched by the user. For instance, the contact locating processor 200 may be further configured to the location of point of contact 300 to a particular touchscreen key, and notify the appropriate application of which key has been chosen by the user.

Although various exemplary embodiments are described above, the present invention also covers any modifications and variations thereof, which do not depart from the scope or spirit of the present invention.

What is claimed is:

1. A liquid crystal display (LCD) device, comprising:
   a casing configured to hold a transparent touchscreen surface in place;
   a liquid crystal (LC) layer disposed within the casing behind the touchscreen surface;
   a probe signal source disposed within the casing behind the LC layer, the probe signal source being configured to transmit a probe signal through the touchscreen surface, the probe signal source including a first probe light source and a second probe light source, each probe light source configured to emit light having a first and second frequency, respectively, wherein the first frequency is different than the second frequency;
   a probe signal sensing device disposed within the casing behind the LC layer; and
   a contact locating device configured to locate a point of contact on the touchscreen surface based on an increase in intensity of a reflection of the probe signal through the touchscreen surface as measured by the probe signal sensing device.

2. The LCD device of claim 1, wherein the LCD device includes a backlight source configured to transmit backlight through the touchscreen surface to convey information to a user.

3. The LCD device of claim 2, wherein the backlight source comprises a plurality of light-emitting diodes (LEDs) including the probe light source.

4. The LCD device of claim 1, wherein
   the probe signal sensing device includes first and second probe light sensing devices, each probe light sensing device including a pair of light sensors for measuring light intensities at the first and second frequencies, respectively.

5. The LCD device of claim 4, wherein the first and second probe light sources are light-emitting diodes (LEDs).

6. The LCD device of claim 4, wherein the first and second frequencies are above 50 Hz.

7. The LCD device of claim 4, wherein the first and second probe light sources are operating in the infrared range.

8. The LCD device of claim 4, wherein the contact locating device includes a digital signal processor (DSP) configured to:
   receive the measured light intensities of the first and second frequencies from each of the first and second probe light sensing devices, and
   determine location coordinates of the point of contact with respect to the planar dimensions of the touchscreen surface based on the received measured intensities.

9. The LCD device of claim 8, further comprising a lookup table (LUT) with location information, the lookup table being accessible to the contact locating device,
   wherein the DSP is configured to determine the location coordinates of the point of contact by performing a lookup of the LUT based on the received measured intensities.

10. The LCD device of claim 9, wherein the location data in the LUTs are calibrated according to internal conditions of the LCD device.

11. The LCD device of claim 9, further comprising an ambient light detector for detecting an ambient light level, wherein DSP is configured to adjust the received measured intensities based on an ambient light level.

12. The LCD device of claim 8, wherein the DSP configured to:
   calculate an angle ($\alpha 1$) associated with a path from the point of contact to the first probe light sensing device;
   calculate an angle ($\alpha 2$) associated with a path from the point of contact to the second probe light sensing device; and
   calculate the location coordinates based on $\alpha 1$ and $\alpha 2$.

13. A liquid crystal display (LCD) device, comprising:
   a casing configured to hold a transparent touchscreen surface in place;
   a liquid crystal (LC) layer disposed within the casing behind the touchscreen surface;
   first and second light-emitting diodes (LEDs) disposed within the casing behind the LC layer, the first and second LEDs being configured to transmit a first and a second probe light, respectively, through the touchscreen surface, the first probe light and the second probe light having a first and second frequency, wherein the first frequency is different than the second frequency;
   first and second light sensing devices disposed within the casing behind the LC layer, each configured to measure intensities of both the first and second probe lights; and
   a processing device configured to detect a point of contact on the touchscreen surface by calculating location coordinates from which the first and second probe signals are reflected back to the first and second light sensing devices based on an increase in the measured intensities.

* * * * *